United States Patent [19]

Fukunaga

[11] Patent Number: 5,700,032
[45] Date of Patent: Dec. 23, 1997

[54] SUPPORTING APPARATUS FOR A STEERING COLUMN

[75] Inventor: Yuichiro Fukunaga, Gunma-ken, Japan

[73] Assignee: NSK, Ltd., Tokyo, Japan

[21] Appl. No.: 581,342

[22] Filed: Dec. 29, 1995

[30] Foreign Application Priority Data

Feb. 3, 1995 [JP] Japan .................. 7-017224

[51] Int. Cl.$^6$ .................................. B62D 1/18
[52] U.S. Cl. ............................. 280/775; 74/493
[58] Field of Search ............... 280/775; 74/492, 74/493

[56] References Cited

U.S. PATENT DOCUMENTS

| | | | |
|---|---|---|---|
| 4,541,298 | 9/1985 | Strutt | 74/493 |
| 4,648,624 | 3/1987 | Mouhot et al. | 280/775 |
| 5,090,730 | 2/1992 | DuRocher et al. | 280/775 |
| 5,199,319 | 4/1993 | Fujiu | 74/493 |
| 5,306,032 | 4/1994 | Hoblingre et al. | 280/775 |
| 5,555,772 | 9/1996 | Schneider | 280/775 |

FOREIGN PATENT DOCUMENTS

| | | |
|---|---|---|
| 57-42138 | 9/1982 | Japan . |
| 2116496 | 9/1983 | United Kingdom . |
| WO95/25032 | 9/1995 | WIPO . |

*Primary Examiner*—Paul N. Dickson
*Attorney, Agent, or Firm*—Shapiro and Shapiro

[57] ABSTRACT

In order to improve the support rigidity of a steering column in the left to right direction thereof, a spacer made of synthetic resin has portions disposed to be strongly sandwiched between the left and right sides of the steering column and the inner sides of left and right support plate portions of a support bracket for the steering column.

3 Claims, 8 Drawing Sheets

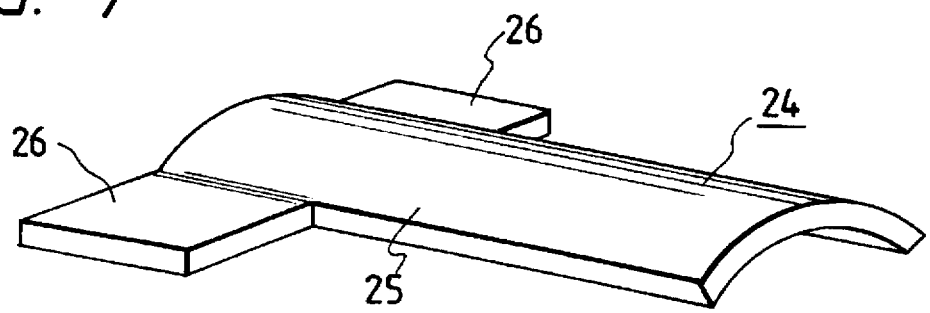
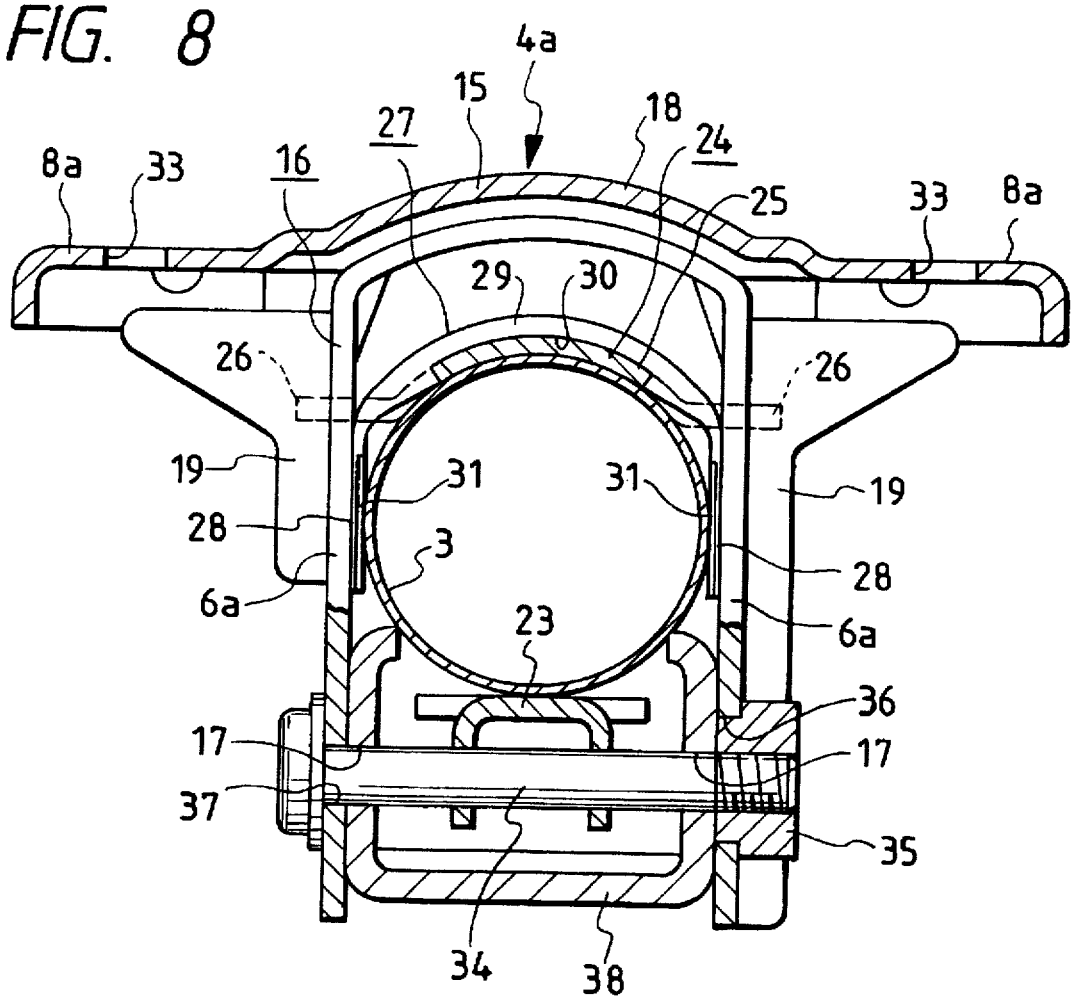

SUPPORTING APPARATUS FOR A STEERING COLUMN

BACKGROUND OF THE INVENTION

1. Field of the Invention

This invention relates to a supporting apparatus for supporting a steering column, of a steering apparatus of an automobile, on a vehicle body.

2. Related Background Art

FIGS. 9 and 10 show one structure of a steering apparatus of an automobile, for example, as in Japanese Utility Model Publication No. 57-42138. The movement of a steering wheel 1 is transmitted to a steering gear, not shown, through a steering shaft 2. The steering shaft 2 is supported inside a cylindrical steering column 3 only for rotation, and this steering column 3 is supported on a vehicle body 5 by a support bracket 4.

This support bracket 4 is made into such a shape as shown in FIG. 10 by bending a steel plate. The support bracket 4 has a pair of left and right support plate portions 6 substantially parallel to each other, and the lower ends of these support plate portions 6 are connected together by a connecting portion 7. Also, the upper end portions of these support plate portions 6 are bent substantially at right angles in opposite directions to provide mounting plate portions 8. The support bracket 4 is fixed to the vehicle body 5 by bolts 9 inserted in through-holes or cut-aways formed in the mounting plate portions 8.

Also, a pair of left and right nut pieces 10 are fixed by, e.g. welding, to those portions of the lower surface of the intermediate portion of the steering column 3 which are opposed to the connecting portion 7. Bolts 11 inserted in through-holes formed in the connecting portion 7 from below to above are thredably engaged and fastened with the nut pieces 10, whereby the intermediate portion of the steering column 3 is fixed to the support bracket 4.

In the case of such structure as shown in FIG. 10, when a load in the left to right direction is applied to the steering column 3, the whole of the support plate portions 6 constituting the support bracket 4 functions as a moment arm for resiliently deforming the support plate portions 6. That is, the length L of the moment arm becomes great and the support plate portions 6 become easy to be resiliently deformed in the left to right direction. As a result, the steering column 3 supported by the support bracket 4 can give a feeling of physical disorder to a driver who operates the steering wheel 1.

In order to eliminate such an inconvenience, the aforementioned Japanese Utility Model Publication No. 57-42138 described the technique of improving the support rigidity of the steering column 3 by such structure as shown in FIG. 11 of the accompanying drawings. In the case of the structure shown in FIG. 11, design is made such that the pair of left and right support plate portions 6 are resiliently deformed toward each other with the fastening of the bolts 11. In a state in which the bolts 11 are fastened and the steering column 3 is fixed to the support bracket 4, the inner sides of the support plate portions 6 resiliently bear against the left and right sides of the steering column 3 to thereby press down this steering column 3 from the left and right sides thereof. Accordingly, in the structure shown in FIG. 11, when a force in the left to right direction is applied to the steering column 3, the length of the moment arm for resiliently deforming the support plate portions 6 becomes L' (<L) sufficiently smaller than L shown in FIG. 10. As a result, when a lateral force is applied to the steering column 3, the support plate portions 6 are difficult to be resiliently deformed and the steering column 3 supported by the support bracket 4 is difficult to be displaced in the left to right direction, thus giving no feeling of physical disorder to the driver who operates the steering wheel 1. However, the structure shown in FIG. 11 has the following points (1) to (3) left to be solved.

(1) Precision is required of the dimensional accuracy and shape accuracy of each part and the assembling work becomes cumbersome, thus increasing costs.

(2) When strong vibration is applied, unusual sound may occur.

(3) The structure cannot be applied to a support apparatus for a steering column incorporating therein a tilt mechanism for making the height position of the steering wheel adjustable. The reason for item (1) above is as follows. In the case of the structure shown in FIG. 11, the inner sides of the support plate portions 6 are separate from the left and right sides of the steering column 3 before the bolts 11 are fastened. With the fastening of these bolts 11, the support plate portions 6 are resiliently deformed toward each other to thereby press down the steering column 3 from the left and right sides thereof. When the fastening of the bolts 11 is completed, the connecting portion 7 and the nut pieces 10 are fixed sufficiently firmly and at the same time, the support plate portions 6 sandwich the steering column 3 therebetween from the left and right sides with a necessary and sufficient force. When the shape and dimension of the parts are innaccurate, however the force with which the steering column 3 is pressed down by the support plate portions 6 during the completion of the fastening of the bolts 11 becomes deficient or conversely becomes excessively great, and it becomes impossible to fasten the bolts 11 so that the connecting portion 7 and the nut pieces 10 are fixed properly.

The reason for item (2) above is as follows. In the case of the structure shown in FIG. 11, the inner sides of the support plate portions 6 and the left and right sides of the steering column 3 contact with each other. Therefore, when strong vibration is applied to the supporting portion of the steering column 3 when running on a rough road or the like, unusual sound like chatter may occur in the contact portion. Such unusual sound gives an unpleasant feeling to the driver and passenger and therefore is not desirable.

Finally, the reason for item (3) above is as follows. In the case of a support apparatus for a steering column incorporating a tilt mechanism therein, as shown in FIG. 12 of the accompanying drawings, a vertically movable bracket 12 is fixed by, e.g., welding, to the lower surface of the intermediate portion of the steering column 3, and this vertically movable bracket 12 is sandwiched from the left and right sides thereof between a pair of left and right support plate portions 6a of a support bracket 4a. When the height position of the steering wheel is to be adjusted, a tilt bolt 13 and a tilt nut 14 are loosened to thereby render the vertically movable bracket 12 vertically movable, and when the height position of the steering wheel is to be fixed, the tilt bolt 13 and the tilt nut 14 are fastened. In the case of the support apparatus for the steering column incorporating such a tilt mechanism therein, the steering column 3 is vertically moved while rotating relative to the support bracket 4a and therefore, in the structure as shown in FIG. 11, the steering column 3 cannot be pressed down from the left and right sides thereof.

SUMMARY OF THE INVENTION

In one embodiment, the present invention provides a supporting apparatus for a steering column with at least the objectives of ease to assemble, preventing the possibility of unusual sound, in addition to incorporating a tilt mechanism therein.

The supporting apparatus for a steering column according to the present invention, like the above-described supporting apparatus for a steering column according to the prior art, is provided with a pair of left and right support plate portions provided on a fixed bracket having its upper end portion supported on and fixed to a vehicle body, a steering column sandwiched between the pair of support plate portions, and a connecting portion or a connecting member connecting the lower ends of said pair of support plate portions together.

Particularly, in the supporting apparatus for a steering column according to the present invention, provision is made of a spacer formed of synthetic resin which is sandwiched between the inner sides of said pair of support plate portions and the left and right sides of said steering column. This spacer is resiliently pressed between the inner sides of said pair of support plate portions and the left and right sides of said steering column. In other words, the spacer is sandwiched between the inner sides of said pair of support plate portions and the left and right sides of said steering column with an interference fit.

According to the supporting apparatus for a steering column in accordance with the present invention constructed as described above, the support rigidity of the steering column in the left to right direction relative to a vehicle body is improved. That is, since the spacer formed of synthetic resin is sandwiched between the inner sides of the support plate portions and the left and right sides of the steering column with an interference fit, the steering column is supported in a portion of the pair of support plate portions wherein the left and right side of the steering column are opposed to each other. The distance between this portion and the base end of each support plate portion is short. In other words, the length of a moment arm which functions to displace the support plate portions in the left to right direction when a force in the left to right direction is applied to the steering column becomes small and therefore, it becomes difficult for the steering column to be displaced in the left to right direction even when a force which displaces the steering column in the left to right direction is applied to the steering column.

BRIEF DESCRIPTION OF THE DRAWINGS

FIG. 7 is a prespective view of a thrust-up preventing plate.

FIG. 8 is a cross-sectional view similar to FIG. 2 but showing a second embodiment of the present invention.

DESCRIPTION OF THE PREFERRED EMBODIMENTS

Figure 1:
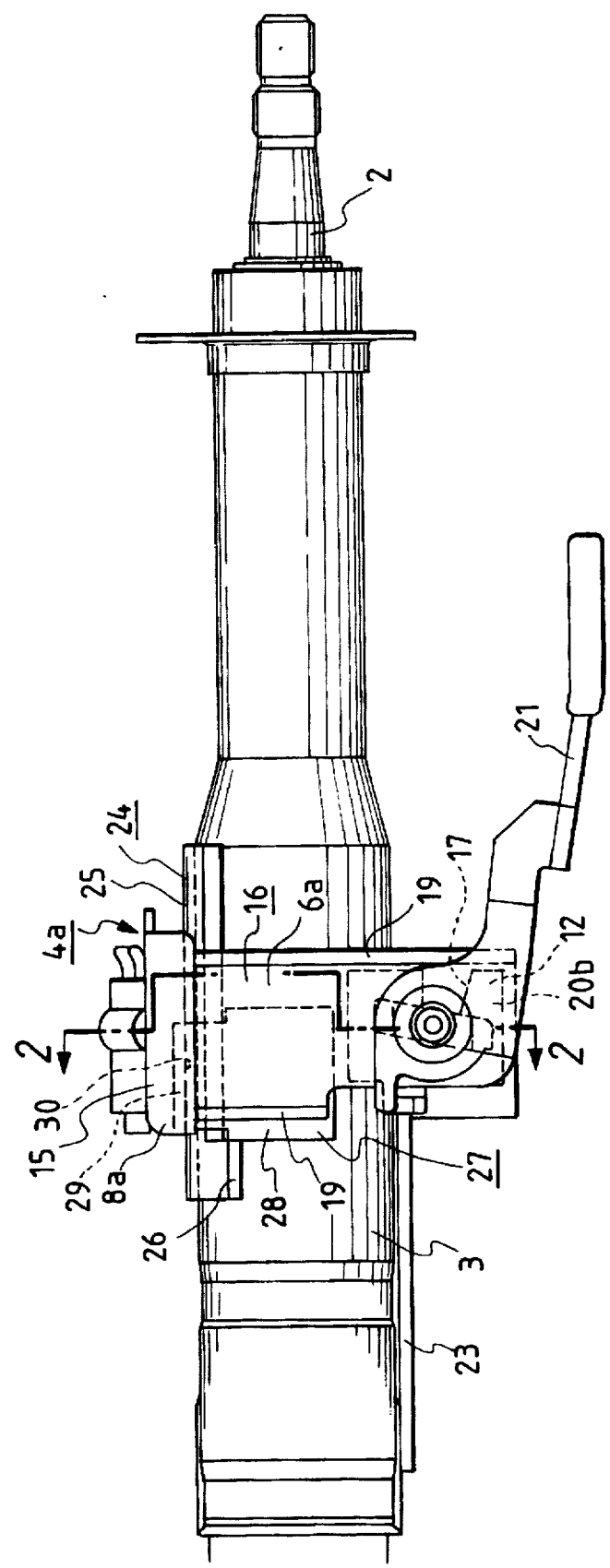
FIG. 1 is a fragmentary side view of a steering column apparatus showing a first embodiment of the present invention.

FIGS. 1 to 7 show a first embodiment of the present invention. A support bracket 4a is supported on and fixed to a vehicle body in the lower portion or the like of a dashboard. This support bracket 4a, made by press-molding a metallic plate such as a steel plate, comprises a mounting plate piece 15 disposed in the widthwise direction of the vehicle body (the front to back direction of FIG. 1 or the left to right direction of FIG. 2) so as to be supported on and fixed to the vehicle body, and a support plate piece 16 for embracing the intermediate portion of a steering column 3, the mounting plate piece 15 and the support plate piece 16 being coupled together. The left and right end portions of the mounting plate piece 15 provide mounting plate portions 8a, and the mounting plate piece 15 is supported on the vehicle body by bolts (not shown) inserted in through-holes 33 formed in the mounting plate portions 8a.

Figure 9:
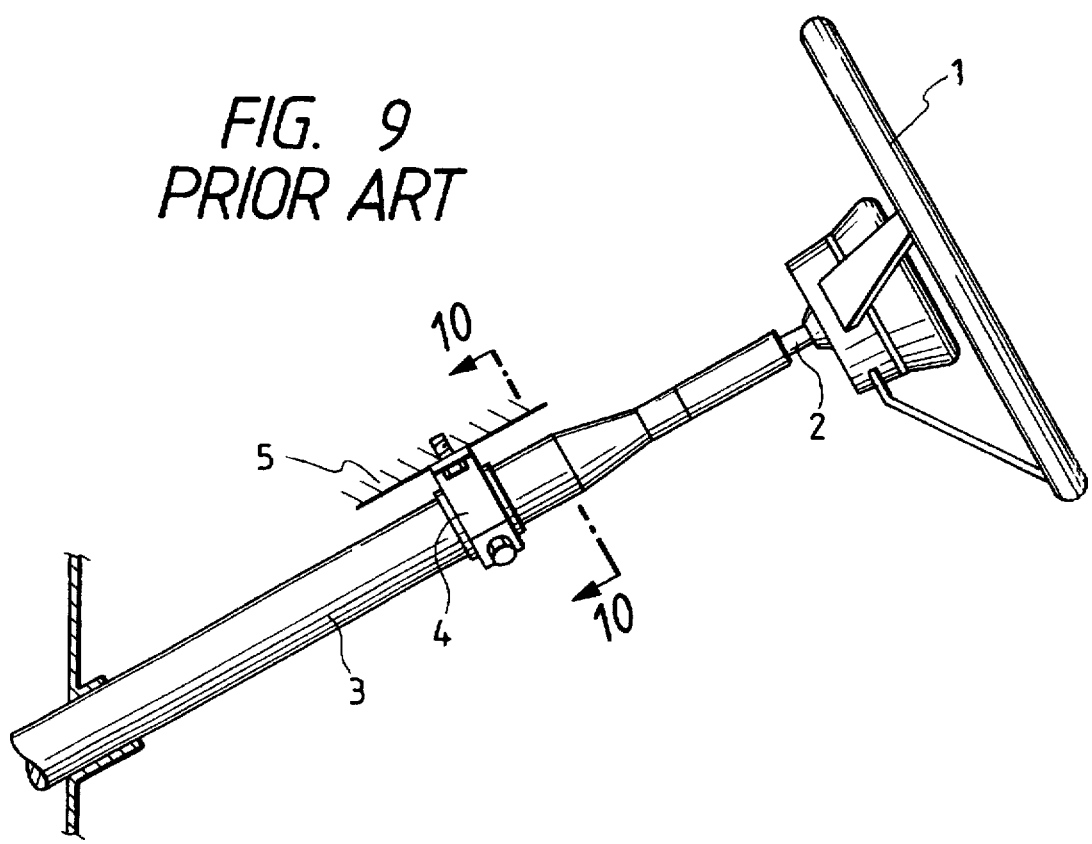
FIG. 9 is a side view showing an example of the steering apparatus according to the prior art.
Figure 10:
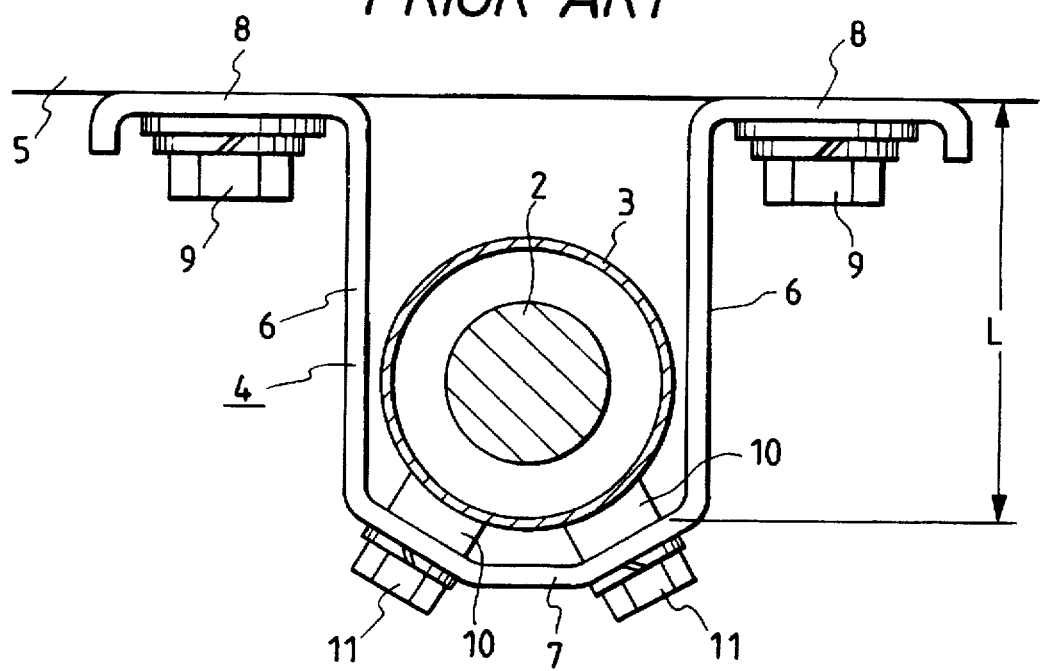
FIG. 10 is a cross-sectional view taken along the line 10—10 of FIG. 9 and showing a first example of the supporting apparatus for a steering column according to the prior art.
Figure 11:
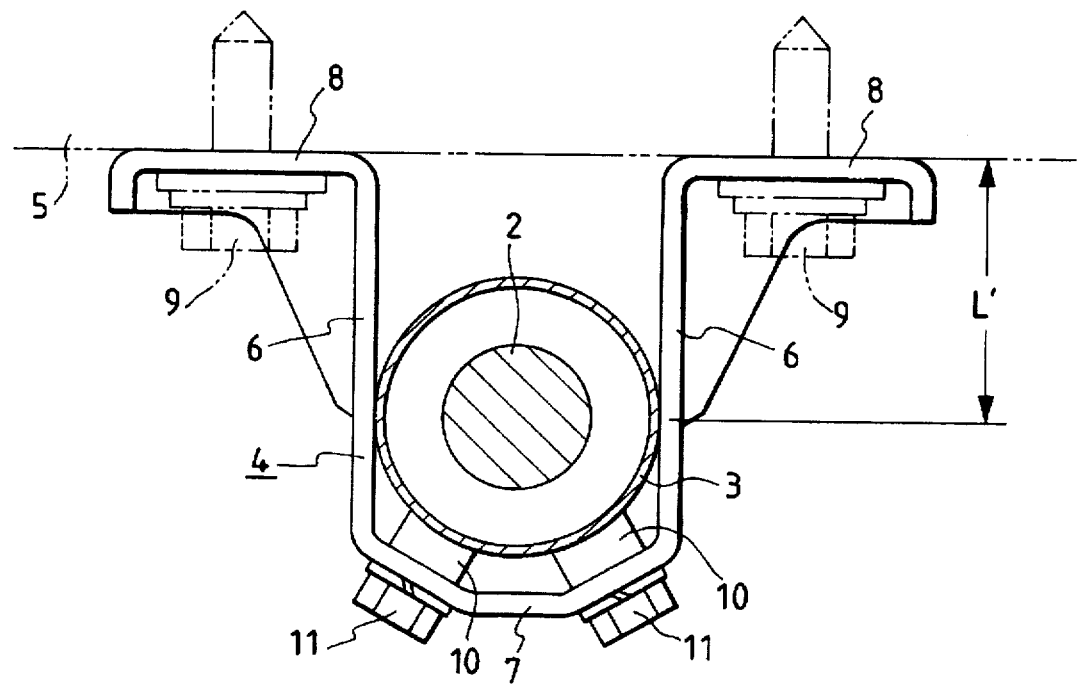
FIG. 11 is a view similar to FIG. 10 but showing a second example.

The support plate piece 16 is formed into an inverted U-shape and is provided with a pair of left and right support plate portions 6a, and a connecting plate portion 18 connecting the upper ends of these support plate portions 6a together. Such a support plate piece 16 is fixed to the underside of the mounting plate piece 15 by striking the upper surface of the connecting plate portion 18 against the central portion of the underside of the mounting plate piece 15 and welding them. Also, the front and rear end edge portions of the pair of support plate portions 6a are bent widthwisely outwardly at right angles to thereby provide bent edges 19, thus improving the flexural rigidity of the support plate portions 6a. Further, vertically long slots 20a and 20b are formed at locations on the lower halves of the support plate portions 6a which are opposed to each other. These slots 20a and 20b are formed into an arcuate shape centering around a lateral shaft (not shown) which becomes the center of pivotal movement of the steering column 3 when the height position of the steering wheel 1 (FIG. 9) is adjusted.

On the other hand, a vertically movable bracket 12, formed by bending a metallic plate (such as a steel plate) is fixed, such as by welding to the lower surface of the intermediate portion of the steering column 3 which is sandwiched between the pair of left and right support plate portions 6a and 6a, as by welding. The width $W_{12}$ of this vertically movable bracket 12 is a little greater than the outer diameter $D_3$ of the steering column 3 ($W_{12} > D_3$). Also, cut-aways 17 are formed in those portions of the left and right walls of the vertically movable bracket 12 which are aligned with the slots 20a and 20b. These cut-aways 17 open into the rear end edges of the above-mentioned left and right walls. A tilt bolt 13 which is a connecting member is inserted from the side of one (right in FIG. 2) support plate portion 6a into the slot 20a, the cutaways 17 and the slot 20b. A tilt nut 14 is threadably engaged with the tip end portion of the tilt bolt 13 protruding from the outer side of the other (left in FIG. 2) support plate portion 6a, and this tilt nut 14 is rotatable by a tilt lever 21. A head 22 provided on the base end portion of the tilt bolt 13 is engaged with a side edge of the slot 20a only for displacement in the lengthwise direction thereof (against rotation) and therefore, the distance between the tilt nut 14 and the head 22 is varied by the rotation of the tilt nut 14 based on the operation of the tilt lever 21. As a result, the pressure of contact between the inner sides of the pair of support plate portions 6a and the left and right outer sides of the vertically movable bracket 12 is adjusted, whereby the fixing and unfixing of the virtically movable bracket 12 can be accomplished.

When the height position of the steering wheel is to be adjusted, the tilt lever 21 is operated in a predetermined direction to thereby widen the distance between the tilt nut 14 and the head 22. As a result, the pressure of contact between the inner sides of the pair of support plate portions 6a and the left and right outer sides of the vertically movable bracket 12 is reduced and thus, this vertically movable bracket 12 becomes vertically movable. Within a range over which, in this state, the tilt bolt 13 is movable inside the slots 20a and 20b, the vertically movable bracket 12 is vertically moved between the pair of support plate portions 6a, whereby the height position of the steering wheel is adjusted. By operating the tilt lever 21 in the opposite direction after the height of the steering wheel is adjusted to a desired position, the distance between the tilt nut 14 and the head 22 is shortened. As a result, the inner sides of the pair of support plate portions 6a and the left and right outer sides of the vertically movable bracket 12 are brought into strong contact with each other, whereby this vertically movable bracket 12 is fixed between the pair of support plate portions 6a and the height position of the steering wheel is fixed-to the position as adjusted.

A thrust-up preventing member 24 is fixed to the upper surface of the intermediate portion of the steering column 3. This thrust-up preventing member 24 prevents the steering column 3 from being thrust up rearwardly toward the driver during a primary collision (the action of an automobile striking against another automobile, a fixed structure or the like). The thrust-up preventing member 24 having such a role is provided with a mounting plate portion 25 curved into a shape along the upper surface of the steering column 3, and stopper portions 26 protruding from the front end of the mounting plate portion 25 toward the left and right sides, and the mounting plate portion 25 is welded and fixed to the upper surface of the steering column 3. The stopper portions 26 are situated in front of the pair of support plate portions 6a. During primary collision, the rear end edges of these stopper portions 26 abut against the front end edges of the pair of support plate portions 6a to thereby prevent the steering column 3 from being thrust up rearwardly toward the driver.

Further, in the shown embodiment, an energy absorbing member 23 is provided between the intermediate portion of the tilt bolt 13 and the underside of the intermediate portion of the steering column 3. This energy absorbing member 23 is made of a metallic material such as a soft steel plate, and is plastically deformed in the direction of extension thereof during secondary collision (the action of the driver's body striking against the steering wheel on the basis of inertia immediately after primary collision) while absorbing the shock energy of the secondary collision. The base end portion of this energy absorbing member 23 is fitted on the intermediate portion of the tilt bolt 13 and has its tip end portion welded to the underside of the steering column 3.

Figure 12:
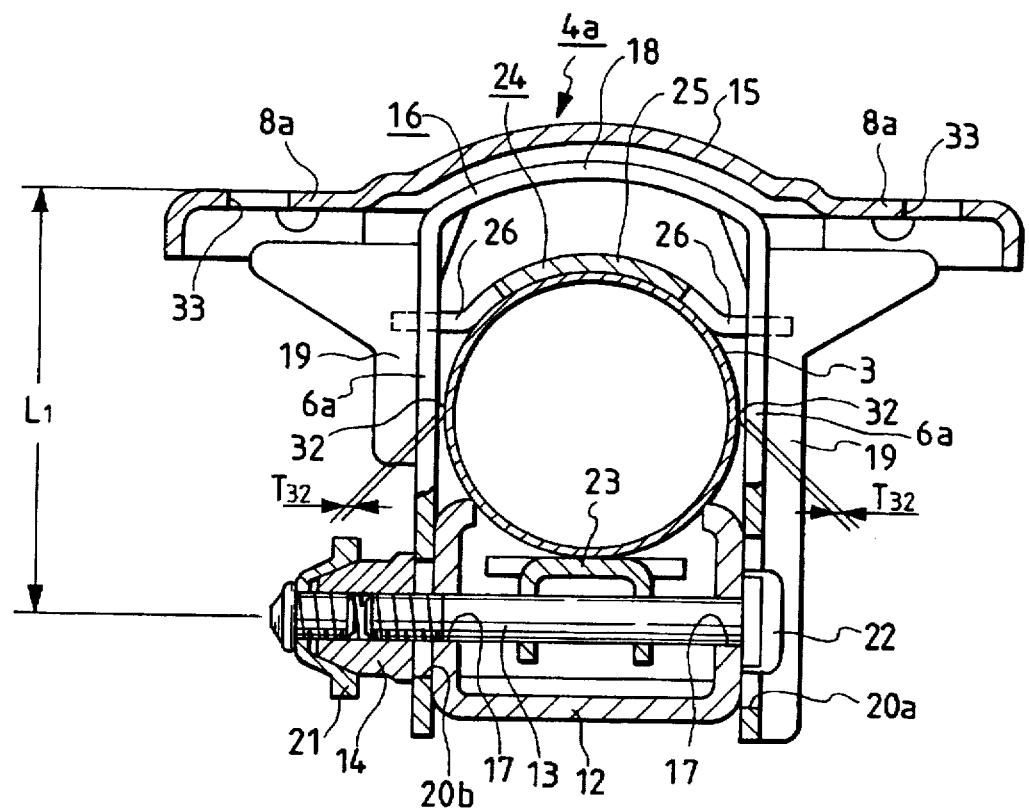
FIG. 12 is a view similar to FIG. 2 but showing a supporting apparatus for a steering column according to the prior art incorporating a tilt mechanism therein.

The above-described construction is similar to the supporting apparatus for a steering column incorporating the conventional tilt mechanism therein which is shown in FIG. 12. However, in the supporting apparatus for a steering column according to the present invention, a spacer 27 is sandwiched between the inner sides of the pair of support plate portions 6a and the left and right sides of the steering column 3. This spacer 27 is formed as a unit by injection molding of synthetic resin.

This spacer 27 has a pair of left and right sandwiching plate portions 28 having their upper ends joined by an intermediate portion 29 having its upper portion curved convexly, and is generally formed into an inverted U-shape. A restraining groove 30 is formed in the underside of the portion 29, and by this restraining groove 30 being engaged with the mounting plate portion 25 of the thrust-up preventing member 24, the spacer 27 is mounted on the intermediate portion of the steering column 3 between the pair of left and right support plate portions 6a. Also, vertically extending ridges 31 are formed on those portions of the inner sides of the pair of sandwiching plate portions 28 which are opposed to the left and right sides of the steering column 3. In a state in which the steering column 3 having the spacer 27 mounted on the intermediate portion thereof is sandwiched between the pair of left and right support plate portions 6a of the support bracket 4a and further, on the basis of the operation of the tilt lever 21, the inner sides of the pair of support plate portions 6a are brought into strong contact with the left and right outer sides of the vertically movable bracket 12, and sandwiching plate portions 28 including the ridges 31 are resiliently pressed between the inner sides of the pair of support plate portions 6a and the left and right sides of the steering column 3.

That is, in a state in which in order to adjust the height position of the steering wheel, the inner sides of the pair of support plate portions 6a are brought into strong contact with the left and right outer sides of the vertically movable bracket 12, the sandwiching plate portions 28 are sandwiched between the inner sides of the pair of support plate portions 6a and the left and right sides of the steering column 3 with an interference fit. In this state, a portion of the sandwiching plate portions 28 including the ridges 31 becomes smaller in thickness by resilient deformation and the remaining portion becomes small in thickness by plastic deformation (setting). The steering column 3 and the support plate portions 6a are also resiliently deformed a little. Accordingly, the thickness $T_{28}$ of the sandwiching plate portions 28 including the ridges 31 is made a little greater than the thickness $T_{32}$ (FIG. 12) of gaps 32 formed between the left and right sides of the steering column 3 and the support plate portions 6a when the spacer 27 is not provided ($T_{28} > T_{32}$).

According to the supporting apparatus for a steering column in accordance with the present invention constructed as described above, the support rigidity of the steering column 3 in the left to right direction relative to the vehicle body is improved. That is, the sandwiching plate portions 28 of the spacer 27 made of synthetic resin are sandwiched between the inner sides of the support plate portions 6a and the left and right sides of the steering column 3 with an interference fit and therefore, the intermediate portion of the steering column 3 is supported by the vertically intermediate portions of the pair of support plate portions 6a. Thus, the distance $L_1'$ between the intermediate portions of the support plate portions 6a sandwiching the intermediate portion of the steering column 3 therebetween and the base end portions of these support plate portions 6a is short. In other words, the length of the moment arm functioning to displace the support plate portions 6a in the left to right direction when a force in the left to right direction is applied to the steering column 3 becomes small. As a result, it becomes difficult for the steering column 3 to be displaced in the left to right direction even when a force which will displace the steering column 3 in the left to right direction is applied to the steering column. In contrast, when, as in the prior-art structure shown in FIG. 12, the spacer 27 is not provided and the gaps 32 and 32 are formed between the left and right sides of the steering column 3 and the support plate portions 6a, the length of the moment arm is $L_1(>L_1')$ which is the distance to the tilt bolt 13. It has already been described that when such a great moment arm length $L_1$ is present, the support rigidity of the steering column 3 in the left to right direction becomes low. Also, according to the supporting apparatus for a steering column in accordance with the present invention, the steering column 3 made of a metal and the support plate portions 6a do not directly contact with each other and therefore, even if great vibration is applied to the vehicle body, unpleasant sound, such as chatter, will not occur.

Figure 2:
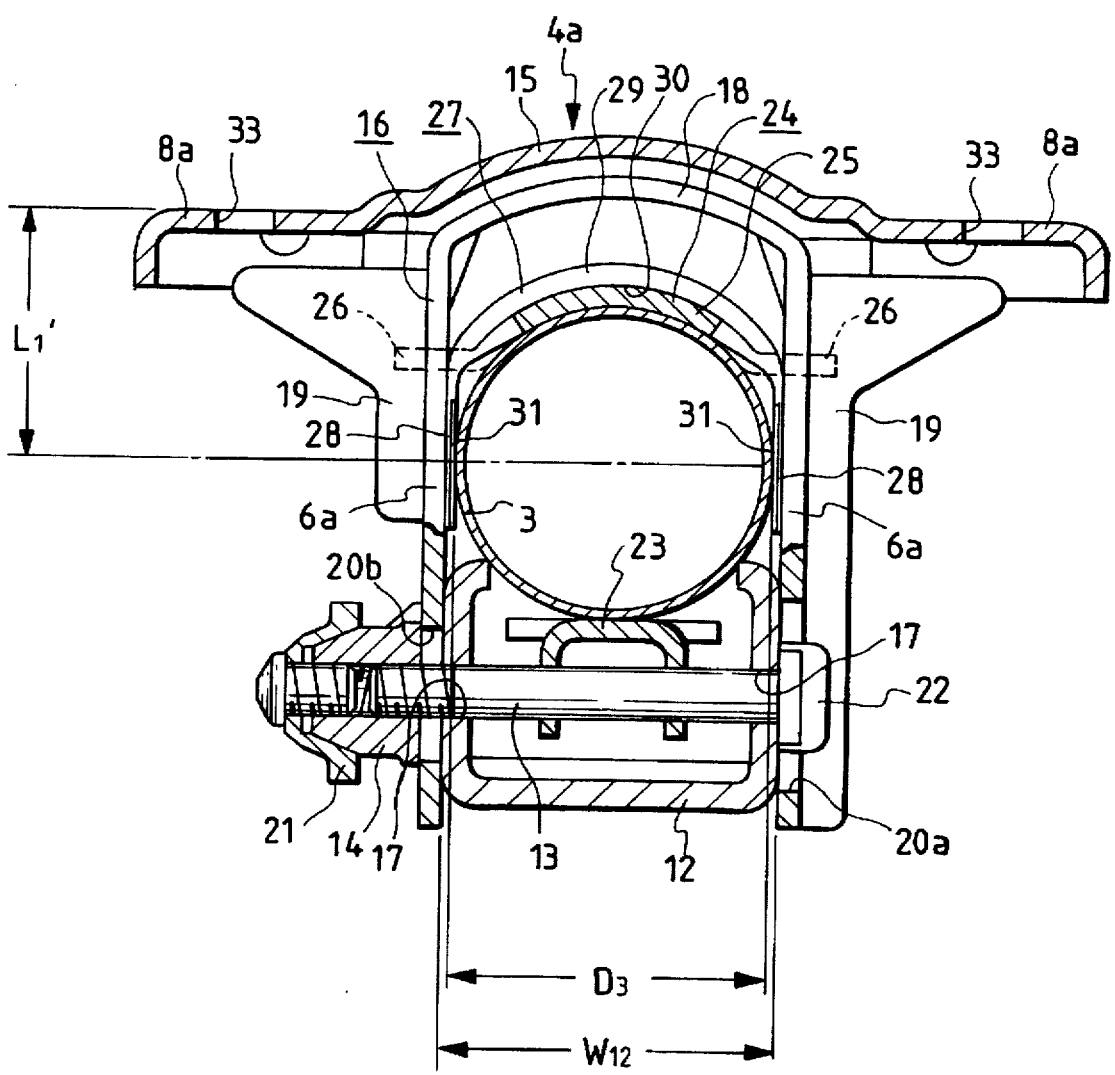
FIG. 2 is an enlarged cross-sectional view taken along the line 2—2 of FIG. 1.
Figure 3:
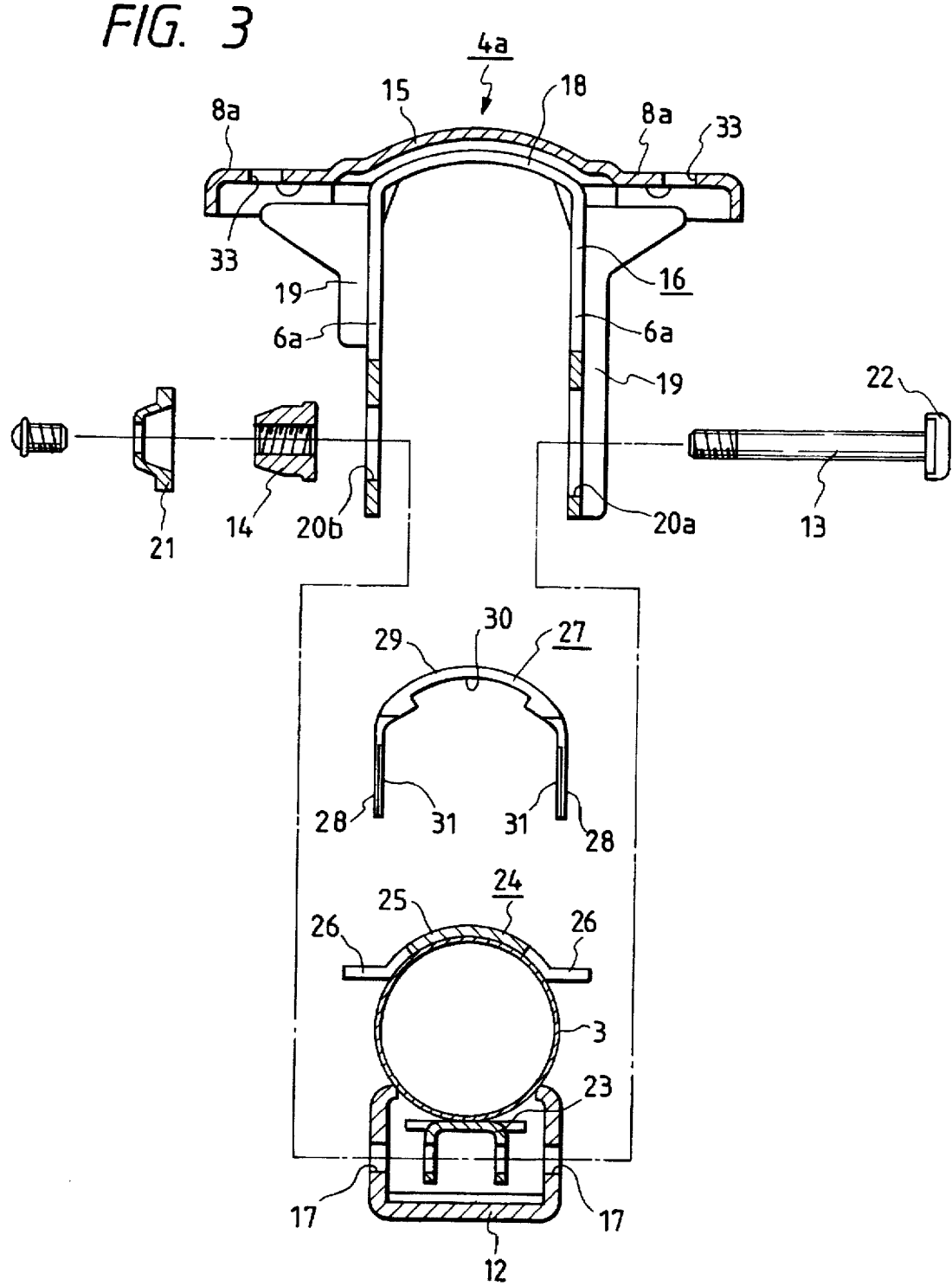
FIG. 3 is an exploded view taken in the same direction as FIG. 2.
Figure 4:
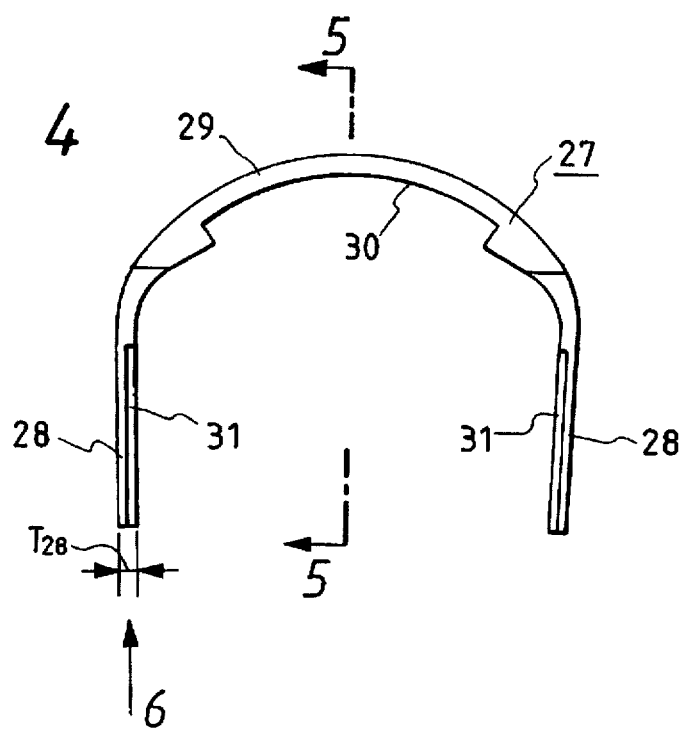
FIG. 4 is an enlarged view showing only a spacer of FIG. 3.
Figure 5:
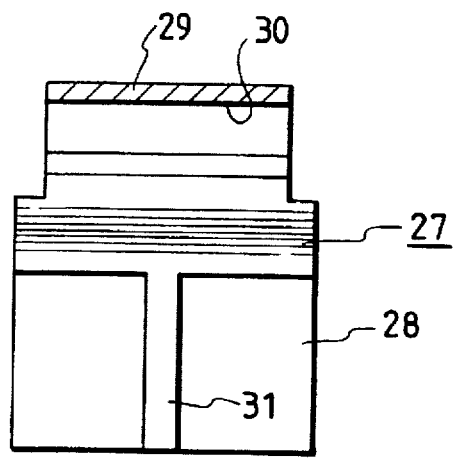
FIG. 5 is a cross-sectional view taken along the line 5—5 of FIG. 4.
Figure 6:
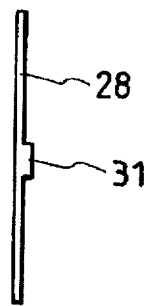
FIG. 6 is a view taken along the arrow 6 of FIG. 4.
Figure 13A:
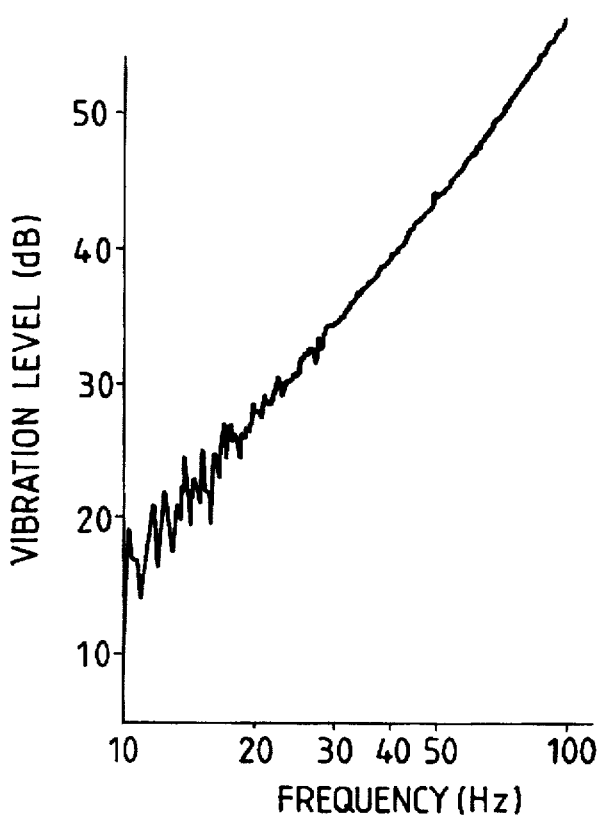
FIGS. 13A and 13B are graphs showing the vibration situations of the structure shown in FIG. 2 and the structure shown in FIG. 12.
Figure 13B:
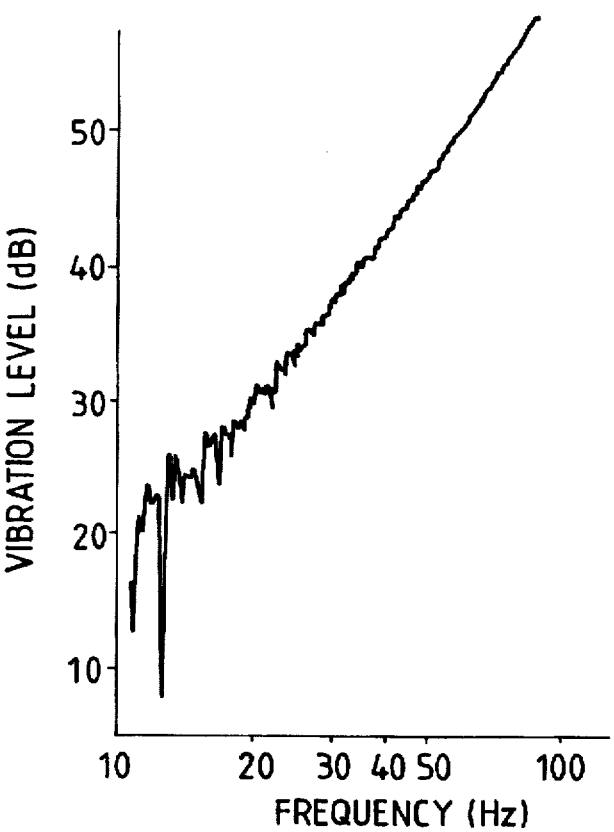

Description will now be made of an experiment carried out to confirm the effect of the present invention. In the experiment, vibration in the left and right directions was applied to the supporting apparatus for a steering column having the conventional structure as shown in FIG. 12 and the supporting apparatus of the structure of the present invention incorporating the spacer 27 therein and constructed as shown in FIG. 2, under the same conditions. The vibration levels of the steering columns 3 supported by the respective structures, in the left and right directions, were measured. The relation between the frequency of vibration and the vibration level was as shown in FIG. 13A for the structure of the present invention shown in FIG. 2, and was as shown in FIG. 13B for the prior-art structure shown in FIG. 12. As is apparent from the comparison between FIGS. 13A and 13B, in the case of the structure of the present invention, the vibration level is lower than in the prior-art structure. Further, on the basis of the graphs of FIGS. 13A and 13B, the rigidity (dynamic rigidity) k for a frequency of 30 Hz was calculated with respect to the structure of each of FIGS. 2 and 12. There is the following relation among the frequency f, the rigidity k and the vibration level dB:

$$dB = 20 \cdot \log((2\pi f)^2/k)$$

Accordingly, the support rigidity at 30Hz which is a vibration frequency liable to occur in a steering column for an automobile can be found from FIGS. 13A and 13B as follows.

The support rigidity $k_0$ in the case of the inventive structure of FIG. 2 is $k_0 = 654$ N/mm because in the graph of FIG. 13A, the vibration level at 30 Hz is 34.7 dB, and the support rigidity $k_1$ in the case of the prior-art structure of FIG. 12 is $k_1 = 437$ N/mm because in the graph of FIG. 13B, the vibration level at 30 Hz is 38.2 dB, and this means an improvement of the rigidity ratio $k_0/k_1 \cong 1.5$ times. The material of the spacer 27 was polypropylene, the thickness $T_{32}$ of the gaps 32 formed between the left and right sides of the steering column 3 and the support plate portions 6a when the spacer 27 was not provided was 1.6 mm, and the thickness $T_{28}$ of the sandwiching plate portions 28 including the ridges 31 in their free state was 1.9 mm.

As is apparent from the result of this experiment, according to the supporting apparatus for a steering column in accordance with the present invention, a great improvement in rigidity can be achieved as compared with the prior-art structure. The present invention is not restricted to a supporting structure incorporating a tilt mechanism therein, but is also applicable to a supporting structure having no tilt mechanism, such as in the second embodiment of the present invention shown in FIG. 8. In the case of the supporting structure shown in FIG. 8, as in the supporting structure of the above-described first embodiment, a bracket 38 is sandwiched between the support plate portions 6a by a bolt 34 and a nut 35. In the case of this supporting structure, however, no tilt mechanism is provided and therefore, holes formed in the support plate portions 6a, unlike the slots 20a in the above-described first embodiment, are made into holes 36 and 37 such as circular holes into which a part of the bolt 34 and nut 35 can only be inserted.

The supporting apparatus for a steering column according to the present invention is constructed and acts as described above and therefore, is simple in structure and can be manufactured inexpensively. Moreover it can be applied to a tilt type steering column, and yet can enhance the support rigidity of the steering column in the left to right direction. Further, no unpleasant sound will occur even if great vibration is applied to the vehicle body.

What is claimed is:

1. Steering column supporting apparatus comprising:
    a steering column with a steering wheel connection portion provided at a rear end of said steering column;
    a fixed bracket supported on and fixed to a vehicle body, said fixed bracket having a pair of left and right support plate portions disposed toward the rear end of said steering column;
    a connecting portion connecting lower ends of said support plate portions together; and
    a spacer made of synthetic resin which is resiliently pressed between inner sides of said left and right support plate portions and a left and a right side, respectively, of said steering column so as to substantially immovably fix said steering column relative to said fixed bracket.

2. Steering column supporting apparatus according to claim 1 wherein said spacer is a one-piece U-shaped spacer member.

3. Steering column supporting apparatus comprising:
    a steering column;
    a fixed bracket having a portion supported on and fixed to a vehicle body, said fixed bracket having a pair of support plate portions between which said steering column is received;
    a connecting portion connecting end portions of said support plate portions together;
    a tilt mechanism which permits height adjustment of said steering column; and
    a one-piece, U-shaped spacer member made of synthetic resin and having resilient spacer portions respectively disposed between inner sides of said support plate portions and opposite sides of said steering column,
    wherein said tilt mechanism includes a member which is moveable between a fixing position in which said resilient spacer portions are pressed to fix said steering column relative to said fixed bracket and a releasing position in which the pressing of said resilient spacer portions is released to permit relative movement between said steering column and said fixed bracket for height adjustment of said steering column.

* * * * *